US011153100B2

(12) United States Patent
Hunt et al.

(10) Patent No.: US 11,153,100 B2
(45) Date of Patent: Oct. 19, 2021

(54) ACHIEVING CERTIFICATE PINNING SECURITY IN REDUCED TRUST NETWORKS

(71) Applicant: Microsoft Technology Licensing, LLC, Redmond, WA (US)

(72) Inventors: Brandon T. Hunt, Redmond, WA (US); Alexander Burba, Seattle, WA (US); Yuval Gross, Redmond, WA (US)

(*) Notice: Subject to any disclaimer, the term of this patent is extended or adjusted under 35 U.S.C. 154(b) by 157 days.

(21) Appl. No.: 16/687,293

(22) Filed: Nov. 18, 2019

(65) Prior Publication Data
US 2021/0152372 A1 May 20, 2021

(51) Int. Cl.
| H04L 29/06 | (2006.01) |
| H04L 9/32 | (2006.01) |
| H04L 9/08 | (2006.01) |
| H04L 9/06 | (2006.01) |

(52) U.S. Cl.
CPC .......... *H04L 9/3268* (2013.01); *H04L 9/0643* (2013.01); *H04L 9/0825* (2013.01); *H04L 9/3297* (2013.01)

(58) Field of Classification Search
CPC ... H04L 9/3268; H04L 9/0643; H04L 9/0825; H04L 9/3297
See application file for complete search history.

(56) References Cited

U.S. PATENT DOCUMENTS

| 9,973,534 | B2 * | 5/2018 | Mahaffey | H04L 63/105 |
| 10,454,689 | B1 * | 10/2019 | Sharifi Mehr | H04L 63/166 |
| 10,917,389 | B2 * | 2/2021 | Chor | G06F 16/27 |
| 2017/0070486 | A1 * | 3/2017 | Lyons | H04L 63/0442 |
| 2019/0207912 | A1 * | 7/2019 | Nielson | H04L 9/0877 |

* cited by examiner

*Primary Examiner* — Shawnchoy Rahman
(74) *Attorney, Agent, or Firm* — Workman Nydegger

(57) ABSTRACT

Achieving certificate pinning security in reduced trust networks. A client establishes a first communications channel with a server only upon verifying that a first certificate offered by the server is certified by a pinned certificate. The client receives a second certificate from the server over the first communications channel. The server and the client establish second communications channels with an untrusted computer system. The client sends a request towards the server via the second communications channels, and the request is received by the server. The server generates a response comprising a payload, a timestamp, a URI portion, and a signature that is generated using the second certificate, and sends the response via the second communications channels. The client receives the response and uses the second certificate to verify that the response is authentic and that the timestamp and URI portion are valid. The client then processes the payload.

20 Claims, 3 Drawing Sheets

ACHIEVING CERTIFICATE PINNING SECURITY IN REDUCED TRUST NETWORKS

CROSS-REFERENCE TO RELATED APPLICATIONS

Not Applicable.

BACKGROUND

Computer systems are frequently coupled to one another to form networks, such as local-area networks and/or wide-area networks (e.g., the Internet), over which the computer systems can transfer electronic data. Many computer systems operate as servers on these networks, to which client computer systems can connect and exchange data. For example, some of the most common servers on the Internet operate using the Hypertext Transfer Protocol (HTTP) to serve up web sites written using the Hypertext Markup Language (HTML), Cascading Style Sheets (CSS), JavaScript, and the like, as well as to serve up many other types of files such as images, sounds, computer programs, etc. The combination of these HTTP servers comprise the World Wide Web. More recently, it has become common for network servers to offer cryptographically-secured communications, which provide for authentication of the accessed server as well as privacy and integrity of any exchanged data while it is in transit. For example, HTTP Secure (HTTPS) is an extension to HTTP, in which the underlying communication protocol is encrypted using technologies such as Transport Layer Security (TLS), Secure Sockets Layer (SSL), and the like.

While technologies such as TLS and SSL typically encrypt exchanged data using symmetric cryptography (i.e., which encrypts and decrypts data using a common encryption key), they also enable the identity of the communicating parties to be authenticated using asymmetric or "public-key" cryptography. For example, a server offering secured TLS/SSL communications typically possesses an end-entity (or leaf) digital certificate. A digital certificate comprises cryptographically-generated data that identifies the certificate owner, that has a validity time window (e.g., a "not valid before" date/time, together with a "not valid after" date/time), and that is uniquely identified by a cryptographic certificate fingerprint. In addition, a digital certificate is associated with a private key and a mathematically-correlated public key. Private keys are typically held only by the party operating the server, while private keys can be disseminated widely. Among other things, public-key cryptography provides for robust authentication. A sender can cryptographically combine a message with a private key to create a digital signature for the message. A recipient can then cryptographically combine the message with the digital signature and the sender's public key to verify whether the message is valid and authentic. As such, a client with possession of a server's public key can authenticate that a signed message actually originated from the server and that it has not been altered.

Digital certificates are issued by entities known as Certificate (or Certification) Authorities (CA's). A CA acts as a trusted third party (i.e., trusted by both the owner of a certificate, and by the party relying upon the certificate), which issues digital certificates, digitally signs certificates to verify their validity, and tracks which certificates have been revoked or have expired. There are a number of trusted "root" CA's which possess heavily-guarded root certificates.

A root CA uses a root certificate to issue and digitally sign intermediary certificates (and, potentially, end-entity certificates). An entity in possession of an intermediary certificate can, in turn, operate as an "intermediary" CA to issue and digitally sign both intermediary certificates and end-entity certificates. Thus, end-entity certificates typically have a cryptographic "chain of trust" via one or more intermediary certificates back to a single root certificate. A certificate chain—from an end-entity certificate, through one or more intermediary certificates, to a root certificate—can include certificates that were issued by different organizations. For example, an organization that operates as a root CA might delegate the rights to be an intermediary CA one or more other organizations. These intermediary CA's might, in turn, be able to delegate further intermediary issuing rights to still other organizations.

Most Internet clients (e.g., operating systems, web browsers, etc.) maintain a collection of trusted root certificates (e.g., based on storing the root certificates' fingerprints). These clients typically trust valid intermediary or end-entity certificates that have a chain of trust that goes back to one of those trusted root certificates. Thus, when establishing a TLS/SSL connection, a client usually trusts and treats as authentic a server that presents a valid end-entity certificate having a chain of trust going back via zero or more valid intermediary certificates to a trusted and valid root certificate.

A client might deem any digital certificate (i.e., root, intermediary, and/or end-entity) in the chain as invalid for one or more of several reasons. For example, the client might determine that a current date and time falls outside of a certificate's validity time period (e.g., because its validity time period has not yet begun, or because its validity time period has lapsed). As another example, the client might identify the certificate's thumbprint in a certificate revocation list (CRL), and therefore determine that the certificate has been revoked by its issuing CA (e.g., because the certificate's private key was compromised).

As computers have proliferated, and as the Internet has become integral to our use of computers, it has become increasingly difficult for some servers (and even server clusters) to service requests from clients. This might be due to the sheer volume of client requests received by those servers and/or due the volume of data that needs to be exchanged as part of those requests. Additionally, the geographic distance of a client computer from a server computer can adversely affect the speed and latency with which that client can communicate with the server. To mitigate these issues, an origin server might be fronted by an intermediary distribution network, such as a content delivery network (CDN), a peer-to-peer (P2P) network, etc. These intermediary networks are positioned between client computers and the origin server, and can operate on behalf of the origin server to distribute the origin server's client load across a great number of computer systems, and in a geographically diverse manner.

In many cases, it may be desirable to enable client computers connecting to computers within an intermediary network to be able to authenticate that the data they receive actually originated from a particular origin server. Accordingly, the origin server's digital certificate—including the certificate's private key—can be installed on the intermediary network's computers so that those computers can offer this certificate to the client computers when establishing a secured connection. While this arrangement might be acceptable if the intermediary network and the origin server are operated by the same entity, this could present significant security concerns if they are operated by different entities, since the entity operating the intermediary network is given access to the origin server's private key. Even if the origin and intermediary are operated by the same entity, distributing the origin server's private key across a potentially large number of intermediary computer systems increases the risk that the private key could be compromised.

BRIEF SUMMARY

At least some embodiments described herein utilize certificate pinning to enable a client to authenticate an origin server as a source of content, and to trust that content, even when the client obtains that content through a reduced trust intermediary network rather from the origin server directly. The embodiments described herein enable such content distribution without requiring that the origin server cede control of its digital certificates to the reduced trust intermediary network. As such, the embodiments herein enable the origin server to utilize the benefits of using intermediary networks, such as content distribution networks, while retaining the same level of source authentication and security that would normally be achievable by distributing content to clients directly.

Some embodiments are directed to methods, systems, and computer program products that achieve certificate pinning security when obtaining data through a reduced trust network. These embodiments establish a secured first communications channel with a trusted first remote computer system. This includes establishing the first communications channel only upon verifying that a first digital certificate offered by the first remote computer system for securing the first communications channel is certified by a pinned certificate. These embodiments also receive, over the first communications channel, an identity of a second digital certificate that is to be used to verify integrity and authenticity of content received over a second communications channel. These embodiments also establish the second communications channel with an untrusted second remote computer system, and send a request over the second communications channel. The request includes a request Uniform Resource Identifier (URI). Based on sending the request, these embodiments also receive a response from the second remote computer system over the second communications channel. The response comprises a payload, a timestamp, a URI portion, and a signature over the payload, the timestamp, the URI portion. These embodiments then verify integrity and authenticity of the response, including (i) verifying that the timestamp is valid, (ii) verifying that the URI portion corresponds to the request URI, and (iii) using the second digital certificate and the signature, verifying that the response is authentic. Based on verifying the integrity and the authenticity of the response, these embodiments process the payload.

Other embodiments are directed to methods, systems, and computer program products that achieve certificate pinning security when serving data through a reduced trust network. These embodiments establish a secured first communications channel with a remote client computer system. This includes offering a first digital certificate to the remote client computer system for securing the first communications channel. The first digital certificate is certified by a certificate that is pinned at the client computer system. These embodiments also send, over the first communications channel, an identity of a second digital certificate that is used by the computer system to protect integrity and authenticity of content sent by the computer system over a second communications channel. These embodiments also establish a second communications channel with an untrusted second remote computer system, and receive a request over the second communications channel. The request originates from the remote client computer system, and includes a request URI. Based on receiving the request, these embodiments generate a payload, a timestamp, and a URI portion comprising at least a subset of the request URI. Using the second digital certificate, these embodiments also generate a signature over the payload, the timestamp, and the URI portion, and send a response over the second communications channel towards the remote client computer system. The response comprises the payload, the timestamp, the URI portion, and the signature.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein utilize certificate pinning to enable a client to authenticate an origin server as a source of content, and to trust that content, even when the client obtains that content through a reduced trust intermediary network rather from the origin server directly. The embodiments described herein enable such content distribution without requiring that the origin server cede control of its digital certificates to the reduced trust intermediary network. As such, the embodiments herein enable the origin server to utilize the benefits of using intermediary networks, such as content distribution networks, while retaining the same level of source authentication and security that would normally be achievable by distributing content to clients directly.

Figure 1:
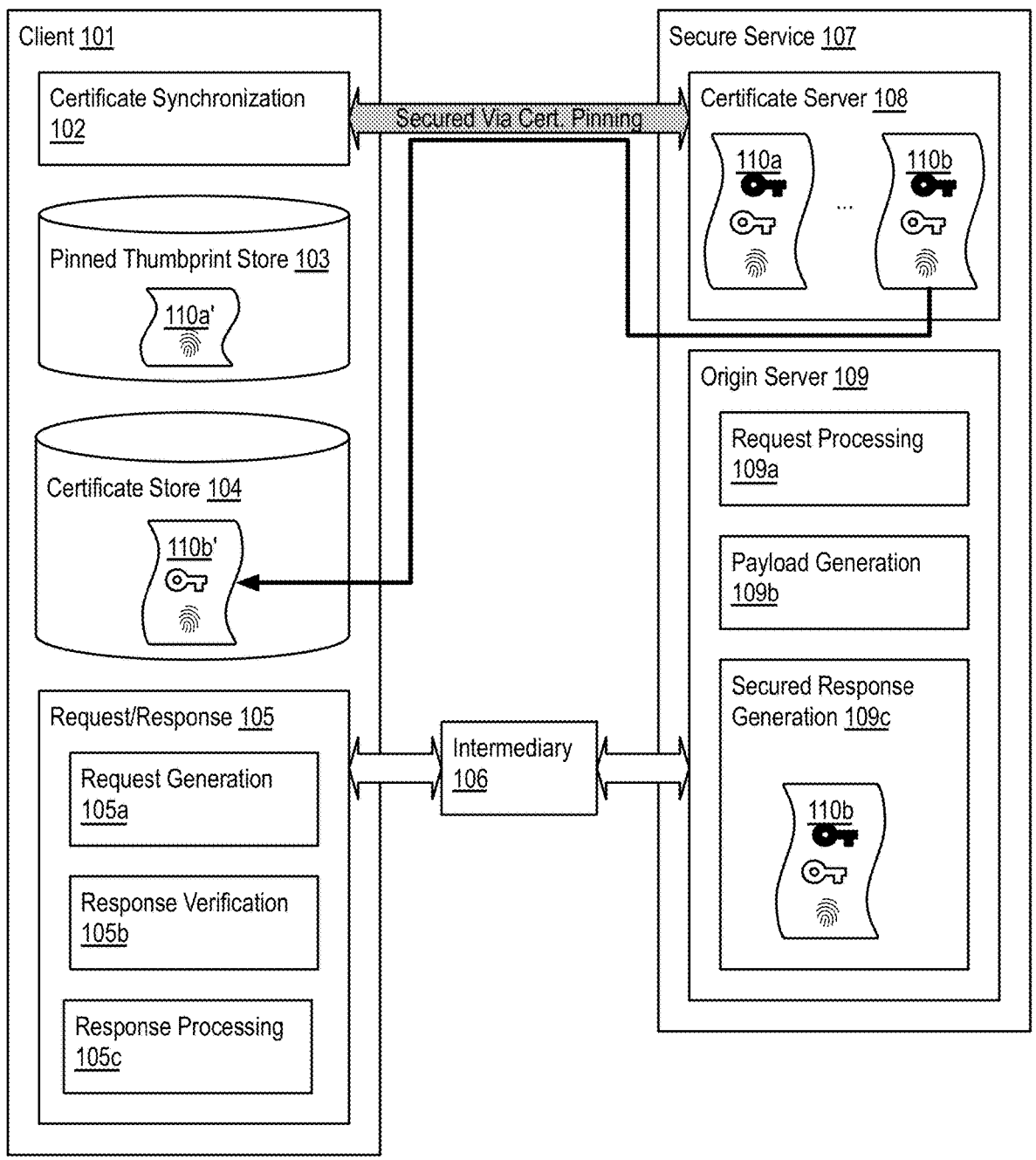
FIG. 1 illustrates an example computer architecture that facilitates achieving certificate pinning security in reduced trust networks.

To the accomplishment of the foregoing, FIG. 1 illustrates an example computing environment 100 that facilitates achieving certificate pinning security in reduced trust networks. Computing environment 100 includes a client 101 and a secure service 107. As shown, the secure service 107 can include a certificate server 108 and an origin server 109. While, for clarity, these servers 108, 109 are shown separately, it will be appreciated that the functionality of the certificate server 108 and the origin server 109 could be implemented on any number of physical computers (i.e., one or more). As illustrated, and as will be described, the client 101 and the secure service 107 can communicate (e.g., over one or more networks) both directly and via an intermediary 106.

In embodiments, the client 101 has a heightened level of trust for the secure service 107 via use of certificate pinning, as compared to the typical trust afforded by public key cryptography. As explained previously, Internet clients typically maintain a collection of trusted root certificates, and thereby those clients usually trust any valid intermediary or end-entity certificates that have a chain of trust that goes back to one of those trusted root certificates. However, at times, trusting an intermediary or end-entity certificate by virtue of a trusted root certificate may be deemed inadequate, since root and intermediary certificates might be issued by different organizations. For example, the secure service 107 might provide critical software updates to the client 101, and it might be deemed an unacceptable risk for the authenticity of those software updates to hinge on trust of a root certificate that was issued by an organization other than the one operating the secure service 107. To illustrate, if that root certificate—which would likely be out of the control of the organization operating the secure service 107—were to be compromised (e.g., because its private key was revealed), a malicious party could use that root certificate to issue fraudulent certificates which would appear to be owned by the organization operating the secure service 107. Using these fraudulent certificates, the malicious party might then trick the client 101 into trusting and installing malicious software updates obtained from the malicious party, rather than from the secure service 107.

Accordingly, client 101 is shown as including a pinned thumbprint store 103, which stores one or more thumbprints of one or more certificates under the control of the secure service 107, and to which the client 101 is "pinned." For example, the secure service 107 is shown as including a certificate server 108, which stores a first certificate 110a. This certificate 110a is shown as including (or otherwise being associated with) a private key (black), a public key (white), and one or more thumbprints (e.g., of the certificate itself, of certificate(s) up the trust chain, etc.). In embodiments, certificate 110a is an end-entity or intermediary certificate that is under the control of the secure service 107. For example, a root CA may have issued an intermediary certificate to an organization operating the secure service 107, enabling that organization to function as its own intermediary CA to issue certificates on its own behalf. Thus, certificate 110a might be this intermediary certificate that was issued to the organization by a root CA, or it may be some certificate that was issued by the organization therefrom. In embodiments, certificate 110a is configured for use by the certificate server 108 for authenticating a secured network connection, such as a TLS or SSL communications channel used HTTPS communications.

Correspondingly, the pinned thumbprint store 103 at the client 101 is shown as storing a thumbprint of certificate 110a (i.e., certificate 110a'). The client 101 is also shown as including a certificate synchronization component 102 (synchronization component 102), which establishes a secured network connection, via certificate pinning, to the certificate server 108. As part of negotiating the secured communications channel, the certificate server 108 offers certificate 110a to the synchronization component 102 for authentication (e.g., by presenting at least the certificate's thumbprint). The synchronization component 102 only validates certificate 110a and establishes the secured communications channel with the certificate server 108 when the certificate offered by the certificate server 108 matches a thumbprint stored in the pinned thumbprint store 103. Thus, the synchronization component 102 relies primarily on a trust chain going to a "pinned" certificate identified in the pinned thumbprint store 103, rather than on a trust chain to a root certificate. As a result, in embodiments, the synchronization component 102 might only validate the certificate's chain of trust until it identifies a pinned thumbprint, rather than proceeding up to the root certificate. By establishing a secured communications channel via certificate pinning— rather than by relying on validity of a trusted root certificate—the synchronization component 102 can be confident that it has established a secure communications channel with a computer for which it has been preconfigured to have a heightened level of trust.

The certificate server 108 is also shown as possessing a second certificate 110b, which is also shown as including (or otherwise being associated with) a private key (black), a public key (white), and one or more thumbprints. While the second certificate 110b could be distinct from the first certificate 110a, it could alternatively be the same certificate as the first certificate 110a. In embodiments, certificate 110b is configured for use by the origin server 109 for signing content sent by the origin server 109 to the client 101 via the intermediary 106, as will be described later. FIG. 1 shows that, using the secured communications channel established between the synchronization component 102 and the certificate server 108 using certificate pinning, the certificate server 108 can send at least a portion of this second certificate 110b to the synchronization component 102, and the synchronization component 102 can store it in a certificate store 104. For example, the certificate store 104 is shown as including certificate 110b', which includes at least the public key and thumbprint of certificate 110b. Since certificate 110b' was received over the communications channel that was established using certificate pinning, certificate 110b might be ascribed the same heightened level of trust by the client 101 as the pinned certificate 110a.

In embodiments, communication of certificate 110b to the client 101 could be a multi-step process. For example, the certificate server 108 might first confirm if the client 101 already has certificate 110b by sending the certificate's thumbprint to the client 101 over the secured connection. Upon receipt of this thumbprint, the synchronization component 102 might determine whether a certificate matching that thumbprint already exists in the certificate store 104. If so, the certificate server 108 need not send the full certificate 110b; otherwise, the certificate server 108 could send the certificate 110b (including at least the certificate's public key and the thumbprint) to the client over the secured connection. Alternatively, the certificate server 108 might send certificate 110b to the client 101 over the secured connection without first confirming if the client 101 has it already.

Use of the synchronization component 102 and the certificate server 108 enables the origin server 109 to utilize multiple certificates (e.g., by providing the client 101 multiple certificates for storing with the client's certificate store 104), and it enables the certificate server 108 to provide newly-generated certificates to the client 101 as needed (e.g., if existing certificates expire, the encryption algorithms they rely on become insecure, or the certificate's private keys are compromised). In embodiments, the certificate server 108 can also instruct the client to add or remove certificate thumbprints within the pinned thumbprint store 103, thereby updating the client 101 as to which certificate(s) to which it should be pinned.

Since the client 101 is ascribing a high level of trust to the certificate server 108, and the data received from it, in some embodiments the client 101 implements one or more of the synchronization component 102, the pinned thumbprint store 103, or the certificate store 104 within an isolated and secured environment. For instance, the client 101 might operate one or more of these components within a secured environment implemented in hardware (e.g. by a processor), and/or one implemented in software using virtualization techniques. Regardless of how it is implemented, this secured environment can operate to isolate those components from other less trusted software and/or hardware at the client 101.

FIG. 1 shows that a request/response component 105 at the client 101 can communicate with the origin server 109 at the secure service 107 via an intermediary (e.g., an intermediary distribution network, such as a CDN or a P2P network). In embodiments, the intermediary 106 comprises one or more "untrusted" (which also referred to synonymously herein as "reduced trust") computer systems, or one or more networks that include at least one untrusted (i.e., reduced trust) computer system. As used in this disclosure, and in the claims, an untrusted/reduced trust network or computer system is a network or computer system that, from the perspective of an organization owning or operating the secure service 107, has a lower level of trust than the computer system(s) comprising the secure service 107, itself (e.g., the certificate server 108 and the origin server 109). Intermediary 106 might be untrusted, for example, because it is owned/operated by a different organization altogether (e.g., a company that operates a CDN or P2P network). Even if the intermediary 106 is owned/operated by the same organization that operates the secure service 107, it might be untrusted, for example, because the intermediary 106 may not be operated with the same security procedures and considerations as the computer system(s) comprising the secure service 107, or because it has a greater potential attack surface than the computer system(s) comprising the secure service 107. As such, the terms "untrusted" and "reduced trust" herein can refer to a spectrum of trust that ranges from no trust at all to some trust, but perhaps not at the same level as the trust ascribed to the secure service 107.

As indicated previously, certificate 110b is used by the origin server 109 for signing content sent by the origin server 109 to the client 101 via intermediary 106. In embodiments, this process begins with a request by the client 101. For example, the client's request generation component 105a can generate and send a request towards the origin server 109, by sending the request to the intermediary 106. This request can be directed to some URI, such that the request includes a request URI. In general, a URI takes the form of:

scheme:[//authority]/path[?query][fragment]

The scheme component can specify a protocol (e.g., HTTP, HTTPS, File Transfer Protocol (FTP), etc.), the authority component can specify a host to which the request is being sent, and the path component can specify a requested primary resource on the host. The query component can specify a query string, while the fragment component can provide direction to a secondary resource (e.g., a header within the primary resource). As an example, if the intermediary 106 is a CDN that accepts and responds to requests on behalf of the origin server 109, a URI used by the request generation component 105a might specify the HTTP or HTTPS protocol as the scheme, might specify an Internet Protocol (IP) address or domain name corresponding to the CDN as the host, and might specify a resource on the origin server 109 using the path (potentially in combination with a query and/or a fragment). The intermediary 106 can, in turn, forward this request—including the URI path and any query and/or fragment—to the origin server 109. For example, within the request URI, the CDN might substitute the CDN's host information with origin server 109's host information. In some environments, a CDN might receive similar requests (e.g., using the same path, query, and fragment combination) from a plurality of clients within a given time period. In these cases, the CDN might "batch" these requests by forwarding a single request to the origin server 109 on behalf of the plurality of clients, thereby reducing load on the origin server 109.

Upon receiving a forwarded request from the intermediary 106, the origin server's request processing component 109a can process the request, including identifying the URI path component, as well as any query and/or fragment components. Based on a path, query, and fragment combination, the origin server's payload generation component 109b can generate (or identify) an appropriate response payload. The particular data included in this payload can vary depending on the services offered by the origin server 109, and by the path, query, and fragment combination in the forwarded request. For example, if the origin server 109 provides software updates, this payload might include one or more software update files, or instructions for where those software update files should be obtained.

After generating a response payload, the secured response generation component 109c (response generation component 109c) can generate a secured response that includes the payload. As shown, the response generation component 109c can include (or otherwise have access to) the certificate 110b discussed above in connection with the synchronization component 102 and the certificate server 108. As such, the response generation component 109c can utilize this certificate's private key as part of generating the secured response. Since the client 101 has obtained this certificate's public key via operation of the synchronization component 102, the client 101 can use is public key to verify integrity and authenticity of the secured response.

Figure 2A:
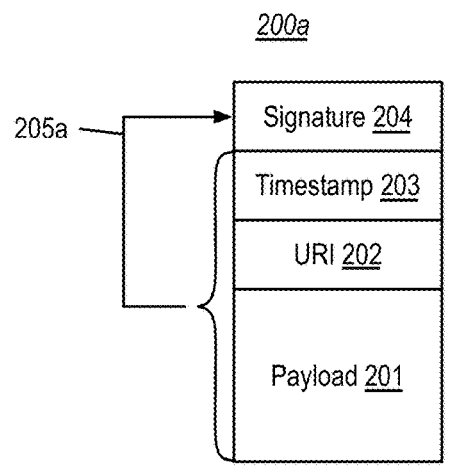
FIG. 2A illustrates an example of a secured response message.

FIG. 2A illustrates an example 200a of a secured response that might be generated by the response generation component 109c. As shown, a secured response can include a payload 201, such as one that was generated by the payload generation component 109b. The secured response can also include a URI 202 (or at least a portion of a URI) and a timestamp 203. In embodiments, the URI 202 comprises at least a portion of the URI that was forwarded to the origin server 109 by the intermediary 106 (and which, in turn, was generated by the client 101). For example, the URI 202 might include at least a path that was in the URI that was forwarded to the origin server 109, potentially with a query and/or a fragment. In embodiments, the timestamp 203 is generated or identified by the response generation component 109c in connection with creating the secured response. For example, the timestamp 203 might correspond to a date/time at which a corresponding request was received by the origin server 109, a date/time at which the corresponding request was processed by the request processing component 109a, a date/time at which the payload was generated by the payload generation component 109b, or a date/time at which the timestamp 203 was generated by the response generation component 109c. Arrow 205a shows that the response generation component 109c creates a signature 204 based on a combination of the payload 201, the URI 202, and the timestamp 203, and inserts this signature 204 into the secured response. In embodiments, the response generation component 109c creates the signature 204 by using the payload 201, the URI 202, and the timestamp 203 as input to one or more cryptographic functions that rely, at least on part, on certificate 110b.

Figure 2B:
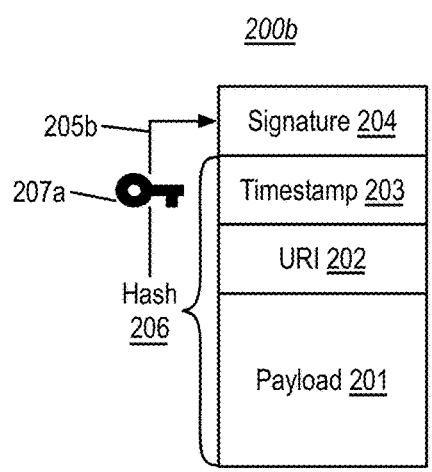
FIG. 2B illustrates an example of generating signature for a secured response message.

For example, FIG. 2B illustrates an example 200b of generating the signature 204 for a secured response message. In example 200b, the response generation component 109c has generated a hash 206 over the payload 201, the URI 202, and the timestamp 203. For example, the response generation component 109c might concatenate the payload 201, the URI 202, and the timestamp 203 (in any order), and use this concatenated data as input to a one-way hashing function. Non-limiting examples of one-way hashing functions that might be utilized include the MD5 message-digest algorithm, and one of a family of the Secure Hash Algorithm (SHA)—such as SHA-1, SHA-256, SHA-512, etc. Arrow 205b shows that, after generating the hash 206, the response generation component 109c has utilized a private key 207a (e.g., from certificate 110b) to generate the signature 204, which is then included in the secure response. In embodiments, the signature 204 is produced by using the private key 207a and the hash 206 as inputs to an encryption algorithm, in order to produce an encrypted version of the hash 205. This encrypted version of the hash 205 is then used as the signature 204 (at least in part). Non-limiting examples of encryption algorithms that might be utilized include the Digital Secure Algorithm (DSA) and the Rivest-Shamir-Adleman (RSA) algorithm.

After having generated a secured response, the origin server 109 sends the secured response towards the client 101, by sending the secured response to the intermediary 106. The intermediary 106, in turn, can forward this response to the client 101. If the intermediary 106 is a CDN that has "batched" requests from multiple clients, it might forward this response to each requesting client. Upon receiving the response, the client 101 uses the response verification component 105b (verification component 105b) to verify the validity and authenticity of the response. For example, returning to FIG. 2A, the verification component 105b might extract the signature 204 from the secured response, and then use this signature 204, together with certificate 110b', to verify the payload 201, the URI 202, and the timestamp 203.

Figure 2C:
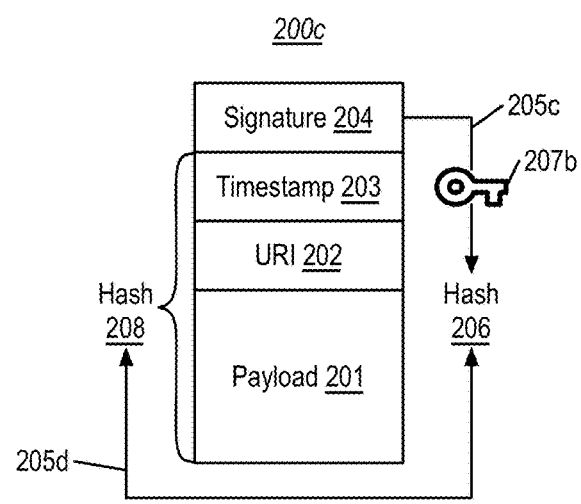
FIG. 2C illustrates an example of signature verification of a secured response message.

FIG. 2C illustrates an example 200c of signature verification of a secured response message, such as the secured response message of FIG. 2B. As shown, the verification component 105b might concatenate the payload 201, the URI 202, and the timestamp 203 in the same order used by the response generation component 109c, and then use this concatenated data as input to the same one-way hashing function used by the response generation component 109c in order to generate hash 208. Arrow 205c shows that the verification component 105b can also utilize a public key 207b (e.g., from certificate 110b') that corresponds to private key 207a to obtain hash 206 from the signature 204. In embodiments, hash 206 is obtained by using the public key 207b and the signature 204 as inputs to the same encryption algorithm used by the response generation component 109c, in order to decrypt the hash 206 from the signature 204. Arrow 205d then shows that, after generating hash 208, and after obtaining hash 206, the verification component 105b can compare these hashes 206, 208. If these hashes 206, 208 match, then the verification component 105b can confirm that the integrity of the payload 201, the URI 202, and the timestamp 203 is sound (i.e., that they have been unaltered), and that the payload 201, the URI 202, and the timestamp 203 actually originated from the secure service 107.

Notably, since the public key from certificate 110b (which was obtained over a connection that was secured via certificate pinning) was used by the client 101 during the verification process, the client 101 can give the payload 201, the URI 202, and the timestamp 203 a heightened level trust. By utilizing certificate pinning in this way, the secure service 107 has distributed a payload to the client 101 in a highly secured manner, and in a manner that permits the client 101 to verify the integrity and authenticity of the payload. Notably, this was all accomplished without giving any private keys to the intermediary 106. Nonetheless, the payload can be as trusted by the client 101 as it would have been if it has been obtained from the origin server 109 directly, even though it was actually obtained via the intermediary 106.

In addition to signature verification, the verification component 105b might can also utilize the timestamp 203 and the URI 202 for further validation of the payload 201 in order to guard against different types of "man in the middle" attacks. For example, the verification component 105b might ensure that the timestamp 203 is a valid timestamp. For instance, the verification component 105b might validate that the timestamp 203 is subsequent to a time at which the client 101 sent the corresponding request towards the origin server 109. In other words, the verification component 105b can verify that the response was not generated prior to a corresponding request. The verification component 105b might also validate that the timestamp 203 is within a recency threshold. In other words, the verification component 105b can verify that the response was generated within a reasonable amount of time since the corresponding request was sent. Verification of the timestamp 203 in this way can protect against potential "replay" attacks by a malicious third party, in which the third party intercepts a valid data transmission (e.g., the response generated by the response generation component 109c), but maliciously or fraudulently repeats or delays delivery of the data transmission to the intended recipient.

The verification component 105b might also ensure that the URI 202 corresponds to the URI that was originally included in the corresponding request generated by the request generation component 105a, and that the client 101 sent towards the origin server 109. For instance, if the URI 202 comprises a path portion (potentially with a query and/or a fragment), the verification component 105b might verify that this path portion (and any a query and/or a fragment) matches the path portion (and any a query and/or a fragment) that was generated by the request generation component 105a. Verification of the URI 202 in this way can protect against potential "spoofing" attacks by a malicious third party.

The following discussion now refers to a number of methods and method acts. Although the method acts may be discussed in a certain orders or may be illustrated in a flow chart as occurring in a particular order, no particular ordering is required unless specifically stated, or required because an act is dependent on another act being completed prior to the act being performed.

Figure 3:
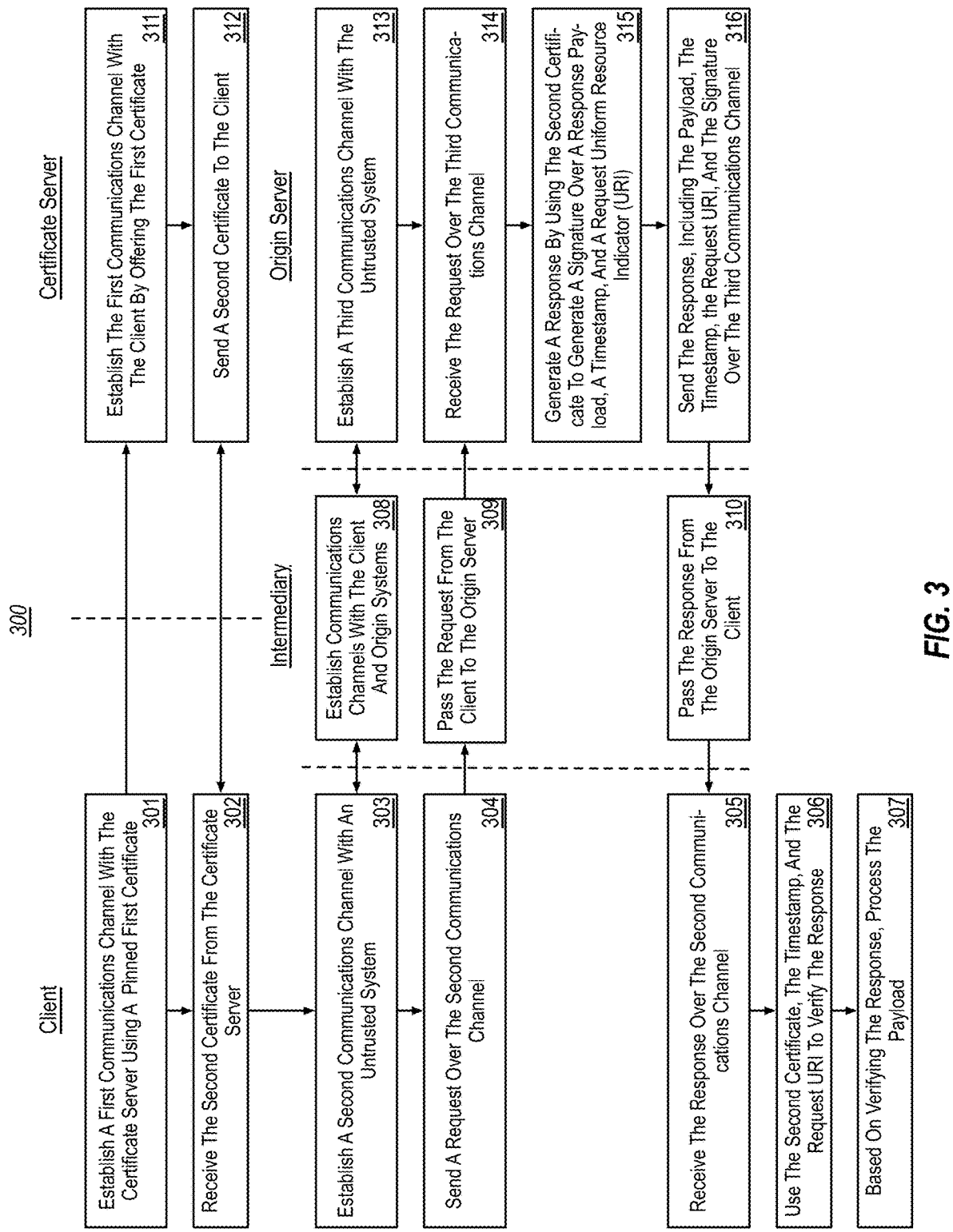
FIG. 3 illustrates a flow chart of an example method for achieving certificate pinning security in reduced trust networks, including acts for achieving certificate pinning security when obtaining data through a reduced trust network that are performed by a client computer, and acts for achieving certificate pinning security when serving data through a reduced trust network that are performed by one or more server computers.

FIG. 3 illustrates a flow chart of an example method 300 for achieving certificate pinning security in reduced trust networks. Method 300 includes acts (e.g., 301-306) that can be performed at a client (e.g., client 101) for achieving certificate pinning security when obtaining data through a reduced trust network, acts (e.g., 311-316) that can be performed at certificate/origin servers (e.g., secure service 107) for achieving certificate pinning security when serving data through a reduced trust network, and acts (e.g., 308-310) that can be performed at an intermediary (e.g., intermediary 106). Method 300 will be described with respect to the components and data of computing environment 100 and the examples 200a/200b/200c of FIGS. 2A-2C.

Method 300 includes an act 301 (at the client) of establishing a first communications channel with the certificate server using a pinned first certificate. In some embodiments, act 301 comprises establishing a secured first communications channel with a trusted server computer, including establishing the first communications channel only upon verifying that a first digital certificate offered by the server computer for securing the first communications channel is certified by a pinned certificate. For example, the synchronization component 102 can establish a secured communications channel with the certificate server 108, based on verifying that a certificate (e.g., certificate 110a) that is presented by the certificate server 108 is pinned at the client 101 (e.g., based on a thumbprint from certificate 110a', stored in the client's pinned thumbprint store 103). This could include verifying that the certificate 110a offered by the certificate server 108 is, itself, pinned (e.g., an end-entity certificate), or that the certificate offered by the certificate server is certified (e.g., signed) by an intermediary certificate that is pinned.

Correspondingly, method 300 also includes an act 311 (at the certificate server) of establishing the first communications channel with the client by offering the first certificate. In some embodiments, act 311 comprises establishing the secured first communications channel with the client computer, including offering the first digital certificate to the client computer for securing the first communications channel. For example, based on the request by the synchronization component 102 in act 301, the certificate server 108 can offer certificate 110a to the client 101 for authenticating the first communications channel.

Based on establishing the first communications channel, method 300 includes an act 312 (at the certificate server) of sending a second certificate to the client, and an act 302 (at the client) of receiving the second certificate from the certificate server. In some embodiments, act 312 comprises sending, over the first communications channel, the identity of the second digital certificate, while act 302 comprises receiving, over the first communications channel, an identity of a second digital certificate that is to be used to verify integrity and authenticity of content received over a second communications channel. For example, the certificate server 108 can send certificate 110b to the client 101 using the secured communications channel established in acts 301 and 311, and the synchronization component 102 can receive this certificate over the secured communications channel. As explained, the certificate server 108 could send certificate 110b as part of a multi-step communications process that first verifies if the client 101 already possesses the certificate, or could send the certificate without prior verification.

As such, sending the identity of the second digital certificate in act 312 could comprise the certificate server 108 sending at least one of a fingerprint identifying the second digital certificate, or the second digital certificate itself. Then, receiving the identity of the second digital certificate in act 302 could comprise the client 101 receiving at least one of a fingerprint identifying the second digital certificate, or the second digital certificate itself. The certificate that is sent to the client 101 can include at least a public key of the certificate.

Method 300 also includes an act 303 (at the client) of establishing a second communications channel with an untrusted system, and an act 304 (at the client) of sending a request over the second communications channel. In some embodiments, act 303 comprises establishing the second communications channel with an untrusted remote computer system, while act 304 comprises sending a request over the second communications channel, the request including a request URI. For example, the request/response component 105 can establish a communications channel with the intermediary 106, and then the request generation component 105a could generate a request and send that request towards the origin server 109 using this communications channel.

As mentioned, the intermediary 106 can comprise computer systems and/or networks that are untrusted by the secure service 107. This could mean that the intermediary 106 is also untrusted by the request/response component 105 because, for instance, the request/response component 105 might be provided by the same organization as the secure service 107. While intermediary 106 could come in many forms, in embodiments it might be an intermediary distribution network, such as a CDN or a P2P network. Thus, in act 303, establishing the second communications channel with the untrusted second remote computer system might comprise establishing a communications channel with one of a CDN or P2P network. Over course, the embodiments herein are not limited to CDN or P2P intermediaries.

Corresponding to acts 303 and 304, respectively, method 300 also includes an act 313 (at the origin sever) of establishing a third communications channel with the untrusted system, and an act 314 (at the origin server) of receiving the request over the third communications channel. In some embodiments, act 313 comprises establishing a third communications channel with the remote computer system, while act 314 comprises receiving the request over the third communications channel. For example, based on act 303, the intermediary 106 might initiate a connection with the origin server 109, or the origin server 109 might otherwise have an established communications channel with the intermediary 106. Over this communications channel, the origin server 109 can receive the request sent by the client 101 in act 304. Since, as discussed, the intermediary 106 might be an intermediary distribution network (e.g., a CDN or a P2P network), in act 313 establishing the second communications channel with the untrusted second remote computer system might comprise establishing a communications channel with one of a CDN or a P2P network.

Notably, method 300 shows that the intermediary facilitates acts 303 and 313 by establishing communications channels with the client and origin server (act 308) and that it facilitates acts 304 and 314 by passing the request from the client to the origin server (act 309).

Returning to the origin server, following act 314, method 300 also includes an act 315 (at the origin server) of generating a response by using the second certificate to generate a signature over a response payload, a timestamp, and a request URI. In some embodiments, act 315 comprises, based on receiving the request, generating the payload, the timestamp, and the URI portion, which comprises at least a subset of the request URI. For example, after processing the request using the request processing component 109a (e.g., based at least on a path component of a URI), the payload generation component 109b can generate or otherwise identify a payload that is appropriate for responding to the request. The response generation component 109c can then identify a URI portion (e.g., at least the path component of the URI) from the request, and identify or generate a timestamp.

Act 315 can also comprise, using the second digital certificate, generating the signature over the payload, the timestamp, and the URI portion. For example, as explained in connection with FIG. 2A, the response generation component 109c might use a concatenated input comprising payload 201, URI 202, and timestamp 203 as input to a cryptographic function that relies on certificate 110b to generate a signature 204. As further explained in connection with FIG. 2B, this might comprise generating a hash 206 over the payload 201, the URI 202, and the timestamp 203, and then using the certificate's private key 207a to encrypt the hash 205 in order to generate the signature 204.

Method 300 also includes an act 316 (at the origin server) of sending the response, including the payload, the timestamp, the request URI, and the signature over the third communications channel. In some embodiments, act 316 comprises sending the response over the third communications channel towards the client computer, the response comprising the payload, the timestamp, the URI portion, and the signature. For example, the origin server 109 can send the response that was generated in act 315 to the client 101 via the intermediary 106.

Correspondingly, method 300 also shows that the intermediary passes the response from the origin server to the client (act 310), and that the client receives the response over the second communications channel (act 305). In some embodiments, act 305 comprises, based on sending the request, receiving a response from the remote computer system over the second communications channel, the response comprising a payload, a timestamp, a URI portion, and a signature over the payload, the timestamp, the URI portion. For example, the request/response component 105 can receive the response that was generated by the origin server 109 in act 315 and that was sent to the client 101 via the intermediary 106 in act 316.

Method 300 also includes an act 306 (at the client) of using the second certificate, the timestamp, and the request URI to verify the response. In some embodiments, act 306 comprises verifying integrity and authenticity of the response, including verifying that the timestamp is valid; verifying that the URI portion corresponds to the request URI; and, using the second digital certificate and the signature, verifying that the response is authentic. For example, the verification component 105b can perform a signature verification of the response, as described in connection with FIGS. 2A and 2C. For instance, in reference to FIG. 2A, the verification component 105b might extract the signature 204 from the response, and then use this signature 204 together with certificate 110b', to verify the payload 201, the URI, and the timestamp 203. In reference to FIG. 2C, this could more particularly include the verification component 105b using the same hashing algorithm that was used by the origin server 109 to create a hash 208 over the payload 201, the URI, and the timestamp 203. This can also include the verification component 105b using the public key from certificate 110b' to decrypt hash 206 from the signature.

Then, the verification component 105b can determine if the two hashes 206, 208 match. Accordingly, in act 307, verifying that the response is authentic could comprise using the public key obtain a first hash from the signature, generating a second hash over the payload, the timestamp, and the URI portion, and determining that the first hash and the second hash match.

In addition, the verification component 105b can verify the timestamp and the URI. For instance, the verification component 105b can verify that the timestamp is valid based on verifying one or more of: (i) that the timestamp is subsequent to a time of sending the request, or (ii) that the timestamp is within a recency threshold. Additionally, the verification component 105b can verify that the URI is valid by ensuring it corresponds to the URI originally requested by the client 101.

Method 300 also includes an act 307 (at the client) of, based on verifying the response, processing the payload. In some embodiments, act 307 comprises, based on verifying the integrity and the authenticity of the response, process the payload. For example, the response processing component 105c can process the payload in any manner appropriate to the content of the payload. As only one example, if the secure service 107 corresponds to a software update service, the response processing component 105c might apply update files included in the payload, or might use information contained in the payload to fetch appropriate update files.

Accordingly, the embodiments described herein utilize certificate pinning to enable a client to authenticate an origin server as a source of content, and to trust that content, even when the client obtains that content through a reduced trust intermediary network rather from the origin server directly. As such, the embodiments herein enable the origin server to utilize the benefits of using intermediary networks, such as content distribution networks, while retaining the same level of source authentication and security that would normally be achievable by distributing content to clients directly, and without requiring that the origin server cede control of its digital certificates to the reduced trust intermediary network.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes at least one processor, for achieving certificate pinning security when obtaining data through a reduced trust network, the method comprising:

establishing a secured first communications channel with a trusted first remote computer system, including establishing the first communications channel only upon verifying that a first digital certificate offered by the first remote computer system for securing the first communications channel is certified by a pinned certificate;

receiving, over the first communications channel, an identity of a second digital certificate that is to be used to verify integrity and authenticity of content received over a second communications channel;
establishing the second communications channel with an untrusted second remote computer system;
sending a request over the second communications channel, the request including a request Uniform Resource Identifier (URI);
based on sending the request, receiving a response from the second remote computer system over the second communications channel, the response comprising a payload, a timestamp, a URI portion, and a signature over the payload, the timestamp, the URI portion;
verifying integrity and authenticity of the response, including:
 verifying that the timestamp is valid;
 verifying that the URI portion corresponds to the request URI; and
 using the second digital certificate and the signature, verifying that the response is authentic; and
based on verifying the integrity and the authenticity of the response, processing the payload.

2. The method of claim 1, wherein verifying that the first digital certificate is certified by a pinned certificate comprises verifying one or more of (i) that the first digital certificate is pinned, or (ii) that an intermediary certificate that certifies the first digital certificate is pinned.

3. The method of claim 1, wherein receiving the identity of the second digital certificate comprises receiving a fingerprint identifying the second digital certificate.

4. The method of claim 1, wherein receiving the identity of the second digital certificate comprises receiving the second digital certificate.

5. The method of claim 1, wherein verifying that the timestamp is valid comprises verifying one or more of: (i) that the timestamp is subsequent to a time of sending the request, or (ii) that the timestamp is within a recency threshold.

6. The method of claim 1, wherein the second digital certificate comprises a public key, and wherein verifying that the response is authentic comprises:
 using the public key obtain a first hash from the signature;
 generating a second hash over the payload, the timestamp, and the URI portion; and
 determining that the first hash and the second hash match.

7. The method of claim 6, wherein generating the second hash comprises using a combination of the payload, the timestamp, and the URI portion as input to the Secure Hash Algorithm (SHA).

8. The method of claim 1, wherein establishing the second communications channel with the untrusted second remote computer system comprises establishing a communications channel with one of a Content Delivery Network (CDN) or a peer-to-peer (P2P) network.

9. The method of claim 8, wherein the response is generated by an origin service that is fronted by the CDN or P2P network.

10. The method of claim 1, wherein the URI portion comprises a URI path component.

11. A method, implemented at a computer system that includes at least one processor, for achieving certificate pinning security when serving data through a reduced trust network, the method comprising:
 establishing a secured first communications channel with a remote client computer system, including offering a first digital certificate to the remote client computer system for securing the first communications channel, the first digital certificate being certified by a certificate that is pinned at the client computer system;
 sending, over the first communications channel, an identity of a second digital certificate that is used by the computer system to protect integrity and authenticity of content sent by the computer system over a second communications channel;
 establishing a second communications channel with an untrusted second remote computer system;
 receiving a request over the second communications channel, the request originating from the remote client computer system, the request including a request Uniform Resource Identifier (URI); and
 based on receiving the request,
  generating a payload, a timestamp, and a URI portion comprising at least a subset of the request URI;
  using the second digital certificate, generating a signature over the payload, the timestamp, and the URI portion; and
  sending a response over the second communications channel towards the remote client computer system, the response comprising the payload, the timestamp, the URI portion, and the signature.

12. The method of claim 11, wherein the certificate that is pinned at the client computer system comprises (i) the first digital certificate, or (ii) an intermediary certificate that certifies the first digital certificate.

13. The method of claim 11, wherein sending the identity of the second digital certificate comprises sending at least one of a fingerprint identifying the second digital certificate, or the second digital certificate.

14. The method of claim 11, wherein the second digital certificate comprises a private key, and wherein using the second digital certificate to generate the signature comprises:
 generating a hash over the payload, the timestamp, and the URI portion; and
 using the private key to encrypt the hash.

15. The method of claim 14, wherein generating the hash comprises using a combination of the payload, the timestamp, and the URI portion as input to the Secure Hash Algorithm (SHA).

16. The method of claim 11, wherein establishing the second communications channel with the untrusted second remote computer system comprises establishing a communications channel with one of a Content Delivery Network (CDN) or a peer-to-peer (P2P) network.

17. The method of claim 11, wherein the URI portion comprises a path component of the request URI.

18. A computer system for achieving certificate pinning security in reduced trust networks, the computer system comprising:
 a client computer that includes one or more first processors and a first computer-readable medium having stored thereon first computer-executable instructions that are executable by the one or more first processors to cause the client computer to:
  establish a secured first communications channel with a trusted server computer, including establishing the first communications channel only upon verifying that a first digital certificate offered by the server computer for securing the first communications channel is certified by a pinned certificate;
  receive, over the first communications channel, an identity of a second digital certificate that is to be used to verify integrity and authenticity of content received over a second communications channel;

establish the second communications channel with an untrusted remote computer system;

send a request over the second communications channel, the request including a request Uniform Resource Identifier (URI);

based on sending the request, receive a response from the remote computer system over the second communications channel, the response comprising a payload, a timestamp, a URI portion, and a signature over the payload, the timestamp, the URI portion;

verify integrity and authenticity of the response including:
  verifying that the timestamp is valid;
  verifying that the URI portion corresponds to the request URI; and
  using the second digital certificate and the signature, verifying that the response is authentic; and based on verifying the integrity and the authenticity of the response, process the payload; and the server computer, which includes one or more second processors and a second computer-readable medium having stored thereon second computer-executable instructions that are executable by the one or more second processors to cause the server computer to:

establish the secured first communications channel with the client computer, including offering the first digital certificate to the client computer for securing the first communications channel;

send, over the first communications channel, the identity of the second digital certificate;

establish a third communications channel with the remote computer system;

receive the request over the third communications channel; and based on receiving the request,
  generate the payload, the timestamp, and the URI portion, which comprises at least a subset of the request URI;
  using the second digital certificate, generate the signature over the payload, the timestamp, and the URI portion; and
  send the response over the third communications channel towards the client computer, the response comprising the payload, the timestamp, the URI portion, and the signature.

19. The computer system of claim 18, wherein the remote computer system is part of a Content Delivery Network (CDN) or a peer-to-peer (P2P) network.

20. The computer system of claim 18, wherein the server computer uses a private key of the second digital certificate to generate the signature, and the client computer uses a public key of the second digital certificate to verify that the response is authentic.

* * * * *